(12) United States Patent
Huang

(10) Patent No.: US 9,758,290 B2
(45) Date of Patent: Sep. 12, 2017

(54) PROCESSING METHOD FOR A VACUUM CONTAINER AND A VACUUM CONTAINER

(71) Applicant: Dongguan Jie-Bao Metal & Plastic Products Co., Ltd., Dongguan (CN)

(72) Inventor: Bruce Huang, Dongguan (CN)

(73) Assignee: Dongguan Jie-Bao Metal & Plastic Products Co., Ltd., Dongguan (CN)

( * ) Notice: Subject to any disclaimer, the term of this patent is extended or adjusted under 35 U.S.C. 154(b) by 76 days.

(21) Appl. No.: 14/965,554

(22) Filed: Dec. 10, 2015

(65) Prior Publication Data

US 2017/0166382 A1    Jun. 15, 2017

(51) Int. Cl.
```
B65D 81/20      (2006.01)
B23K 9/173      (2006.01)
B23K 26/21      (2014.01)
B23K 101/04     (2006.01)
B23K 103/04     (2006.01)
```
(52) U.S. Cl.
CPC .......... *B65D 81/2015* (2013.01); *B23K 9/173* (2013.01); *B23K 26/21* (2015.10); *B23K 2201/04* (2013.01); *B23K 2203/05* (2015.10)

(58) Field of Classification Search
USPC ..... 219/121.66; 228/175, 184; 220/612, 678
See application file for complete search history.

(56) References Cited

U.S. PATENT DOCUMENTS 4,351,451 A * 9/1982 Chung ............... A47J 41/028
                                                       215/12.1
5,031,519 A * 7/1991 Toida ................... A47J 37/01
                                                       126/369

\* cited by examiner

*Primary Examiner* — Samuel M Heinrich

(57) ABSTRACT

The present invention relates to a processing method for a vacuum container and a vacuum container, characterized in that, the processing method for a vacuum container comprising a step of welding a sealing fin, wherein welding a sealing fin onto an inner wall of an outer container, and leaving an empennage for welding at the bottom of the outer container; and a step of welding an outer bottom cap, wherein welding an outer bottom cap seamlessly on the empennage by means of argon arc welding. In accordance with the present invention, the sealing fin is welded on the outer container and an empennage for welding is left at the bottom of the outer container, and the outer bottom cap is welded by means of argon arc welding to the empennage, thus the heat preservation effect of the vacuum container can be ensured and no interlayer nor seam exists between the outer bottom cap and the outer container, the outer bottom cap and the outer container can be closely connected and integrally formed, and the vacuum container is easy to wash and use.

5 Claims, 4 Drawing Sheets

PROCESSING METHOD FOR A VACUUM CONTAINER AND A VACUUM CONTAINER

TECHNICAL FIELD

The present disclosure relates to the technical field of household-appliances, and more particularly, to a processing method for a vacuum container and a vacuum container.

BACKGROUND OF THE INVENTION

With the demands of daily living, vacuum container is becoming more and more important to people's daily life. The existing vacuum containers include vacuum cup, vacuum jug, etc. Take a vacuum jug as an example, a vacuum jug available comprises an outer container and an inner container which is arranged inside of the outer container and used for filling liquid, the outer wall of the inner container is separated from the inner wall of the outer container, and the top of the inner container is hermetically connected with the top of the outer container, the opening of the vacuum jug where the outer container and the inner container are hermetically connected is formed at the top of the vacuum jug. A sealing fin is aligned with and welded to the bottom edge of the outer container of the vacuum jug in argon arc welding manner, the air between the inner container and the outer container is removed to form vacuum in order to ensure the heat preservation property effectively.

However, a welding part is formed while welding the sealing fin and the outer container, and it will influence the appearance of the vacuum jug. There are two solutions used in the prior art to cover the welding part so as to avoid the influence on the entire vacuum jug exerted by the welding part.

Solution 1: as illustrated in FIG. 1, an outer bottom cap 4 covering the welding part 6 is fixed at the bottom of the vacuum jug; since the welding part 6 is formed by argon arc welding between the sealing fin 3 and the bottom edge of the outer container 1 at the bottom of the vacuum jug in order to achieve heat preservation and seal between the outer container 1 and the inner container 2, fine leak may occur at the previous welding part due to the high temperature while welding once again by argon arc welding along the bottom edge of the outer container 1, thus resulting in disappearance of the vacuum area between the outer container 1 and the inner container 2, and the vacuum jug loses its heat preservation function. The outer bottom cap has to be fixed at the bottom of the vacuum jug by other ways, such as bonding with glue, connection by screws.

Solution 2: a non-slip mat covering the welding part is fixed at the bottom of the vacuum jug with glue.

However, as illustrated in FIG. 1, an interlayer 5 is provided between the bottom cap 4 and the outer container 1 of the vacuum jug in order to achieve fixation. Since an interlayer 5 exists between the outer container 1 and the bottom cap 4, there is a risk that the bottom cap 4 may drop out in case the connection at the position of the interlayer 5 becomes loose, resulting in incompleteness of the vacuum jug and inconvenience use due to the exposure of the welding part. More specially, it is easy for water to permeate into the welding part when the vacuum jug is washed, and this will cause inconvenient to users, and deteriorate the compactness and the strength of the connection between the vacuum jug and the outer bottom cap.

SUMMARY OF THE INVENTION

Accordingly, the object of the present invention is to provide a processing method for a vacuum container and a vacuum container, wherein the fixed connection between the outer bottom cap and the outer container is compact without providing interlayer between the outer bottom cap and the outer container.

To achieve the object of the present invention, the technical solution of the present invention is as follows:

According to an aspect of the disclosure, there is provided a processing method for a vacuum container, comprising the steps of:

a step of welding a sealing fin, wherein welding a sealing fin onto an inner wall of an outer container, and leaving an empennage for welding at the bottom of the outer container;

a step of welding an outer bottom cap, wherein welding an outer bottom cap seamlessly on the empennage by means of argon are welding.

Furthermore, in the step of welding a sealing fin, welding the sealing fin on the inner wall of the outer container by means of laser welding.

Furthermore, in the step of welding an outer bottom cap, polishing the welding mark after the outer bottom cap is welded onto the outer container.

Furthermore, a folding edge is provided by bending the edge of the sealing fin, and welding a sealing fin means to weld the folding edge of the sealing fin onto the inner wall of the outer container.

Furthermore, in the step of yielding an outer bottom cap, aligning the edge of the empennage with the edge of the outer bottom cap before welding the outer bottom cap onto the empennage.

According to another aspect of the disclosure, there is provided a vacuum container, comprising, an outer container; an inner container which is arranged inside of the outer container and used for filling liquid; and a sealing fin, wherein the outer wall of the inner container is separated from the inner wall of the outer container, and the top of the inner container is hermetically connected with the top of the outer container, characterized in that:

fixing the sealing fin on the inner wall of the outer container by means of welding, and leaving an empennage for welding at the bottom of the outer container;

the vacuum container also includes an outer bottom cap which is welded seamlessly onto the empennage by means of argon arc welding.

Furthermore, the sealing fin is fixed on the inner wall of the outer container by means of laser welding.

Furthermore, a folding edge is provided by bending the edge of the sealing fin, and the folding edge of the sealing fin is welded to the inner wall of the outer container to ensure that the sealing fin is fixed on the inner wall of the outer container.

Furthermore, the sealing fin is made of stainless steel.

Furthermore, the outer bottom cap is made of stainless steel.

Compared to the existing methods in the prior art, the processing method for a vacuum container according to the present invention has following advantages, the sealing fin is fixed on the inner wall of the outer container in a welding way, preferably by means of laser welding, and an empennage for welding is left at the bottom of the outer container, then the outer bottom cap is welded through argon arc welding to the empennage at the bottom of the outer container in accordance with the embodiment, thereby no fine leak will occur at the positions of welding, since the positions of welding in the two welding steps are different, thus the seal effect between the sealing fin and the outer container of the vacuum container can be ensured, and the heat preservation effect thereof can be ensured.

In addition, as the outer bottom cap and the empennage of the outer container are welded and fixed by means of argon arc welding, the edge of the outer bottom cap is aligned with the bottom edge of the outer container during the welding process such that no interlayer nor seam exists between the outer bottom cap and the outer container, therefore the outer bottom cap and the outer container can be closely connected and solidly fixed and integrally formed. With the perfect effect of the respective sealing connection between the outer container of the vacuum container and the sealing fin and the outer bottom cap, thus the vacuum container is easy to wash, manufacture, use and carry, and is able to prevent the liquid from penetrating into the inside of the vacuum container.

Figure 1:
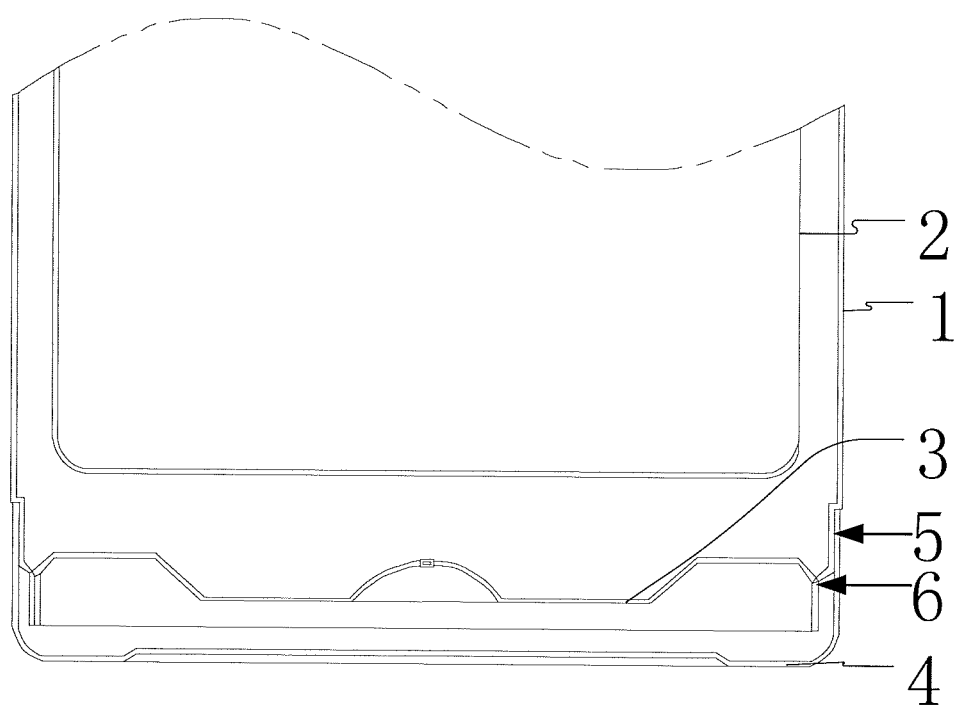
FIG. 1 is a sectional view illustrating part of a traditional vacuum jug.

wherein,
1: Outer container;
2: Inner container;
3: Sealing fin;
4: Outer bottom cap;
5: Interlayer;
6: Welding part;
10: Vacuum container;
11: Opening;
12: First welding line;
13: Second welding line;
100: Outer container;
110: Empennage;
200: Inner container;
300: Sealing fin;
310: folding edge;
400: Outer bottom cap

DETAILED DESCRIPTION OF THE INVENTION

The present invention discloses a processing method for a vacuum container and a vacuum container, wherein, the processing method includes a step of welding a sealing fin and a step of welding an outer bottom cap; the step of welding a sealing fin is to weld the sealing fin to the inner wall of the outer container while leaving a empennage for welding at the bottom of the outer container; the step of welding the outer bottom cap is to weld the outer bottom cap to the empennage at the bottom of the outer container through argon arc welding. According to the present invention, the sealing fin is welded to the outer container and the empennage for welding is left at the bottom of the outer container, then the outer bottom cap is welded to the empennage at the bottom of the outer container through argon arc welding, thus it ensures the heat preservation effect of the vacuum container, and no interlayer nor seam exists between the outer bottom cap and the outer container, therefore the outer bottom cap and the outer container can be closely connected and integrally formed, and the vacuum container is easy to wash and use.

The present invention will be furthermore described with reference to the accompanying drawings and the embodiments.

It should be understood that positions or directions indicated by the terms such as "center", "transverse", "up", "down", "left", "right", "vertical", "horizontal", "top", "bottom", "inner", "outer" are the positions or directions with reference to the accompanying drawings, they are used only for convenience of description rather than indicating that the equipment or element should be located in the given position or operated or configured in the given position, therefore it should be understood that the present invention is not limited to the above tell is. In addition, the terms "first", "second" are used only for description rather than indicating the significance nor the numbers of the technical features. Thus the features defined by "first", "second" may include one or more said features. It should be understood that in the description the term "a plurality of" means two or more, unless otherwise specified. In addition, the term "include" means "include but is not limited to".

It would be understood that the terms "install", "connect" should be construed broadly, unless otherwise specified or defined, such as fixed connection, or detachable connection, or connection through intermediate elements, or internal communication of two elements. It should be understood for the person skilled in the art to interpret the terms which coincide with the technical idea of the present invention.

The vacuum container 10 and the processing method for the vacuum container 10 will be described with reference to FIGS. 2-4, the vacuum container 10 may be a vacuum jug. A vacuum jug is taken as an example to illustrate the vacuum container 10 in the description of the present application thereafter. Of course, it should be understood for the person skilled in the art that the vacuum jug is only an exemplary embodiment of the vacuum container 10, but the present invention is not limited thereto. And the vacuum container 10 may be other kinds of vacuum containers, such as vacuum cup.

Figure 2:
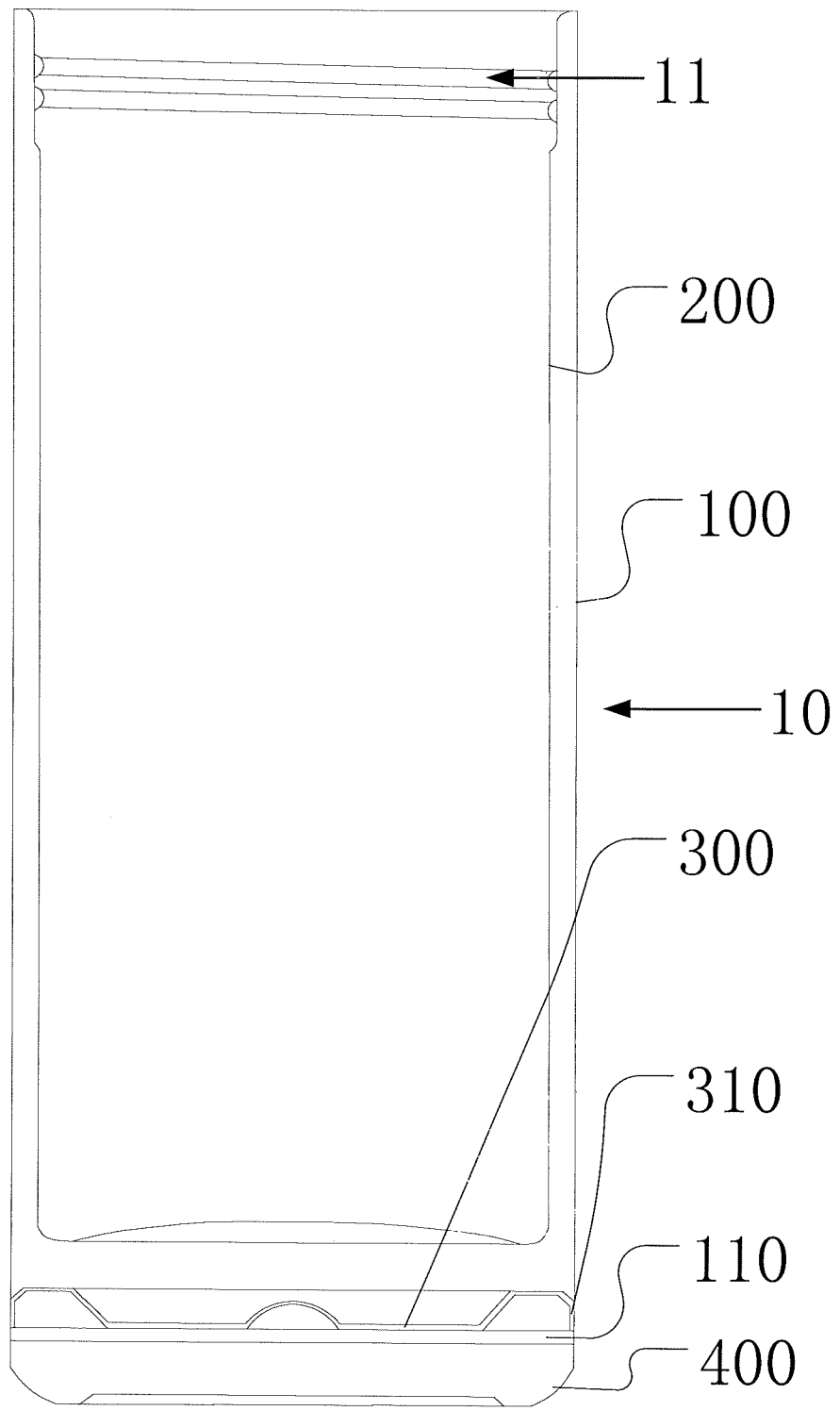
FIG. 2 is a sectional view illustrating the vacuum jug according to an embodiment of the present invention.
Figure 3:
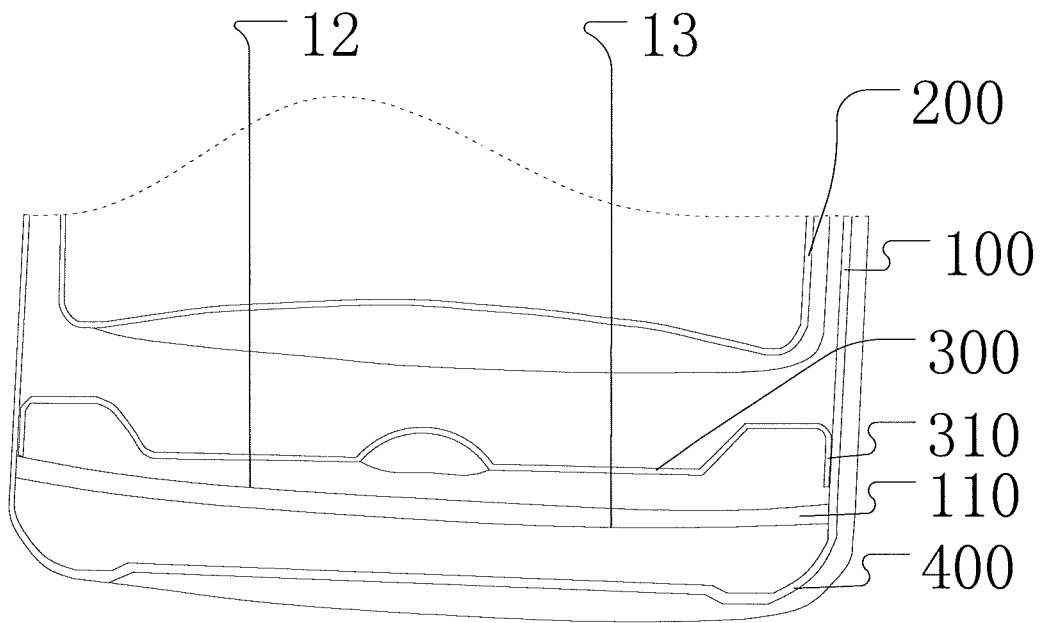
FIG. 3 is a sectional view illustrating part of the vacuum jug according to an embodiment of the present invention.

The embodiment of the present invention illustrated in FIGS. 2 and 3 discloses a vacuum container 10, and the present invention takes a vacuum jug as an exemplary embodiment in order to describe in particular.

Wherein the vacuum jug 10 includes an outer container 100, and an inner container 200 which is arranged inside of the outer container 100 and used to fill with liquid, the outer wall of the inner container 200 is separated from the inner wall of the outer container 100, the top of the inner container 200 is hermetically connected with the top of the outer container 100, the opening 11 of the vacuum jug where the outer container 100 and the inner container 200 are hermetically connected is formed at the top of the vacuum jug 10.

There are only one outer container 100 and one inner container 200 located in the inside of the outer container 100 in the embodiment as illustrated in FIGS. 2 and 3. However, it is possible to install two or more inner containers which are separated respectively and sealed with each other inside one outer container.

The vacuum jug 10 may further include a sealing fin 300 as illustrated in FIGS. 2 and 3, the top of the outer container 100 is connected with the inner container, the other end of the outer container 100, that is, the bottom of the outer container 100, is connected with the sealing fin 300, so the sealing fin 300 and the outer container 100 form into a whole, thus sealing is realized between the inner container 200 and the outer container 100 and heat preservation effect is achieved. More specifically, the sealing fin 300 is fixed on the inner wall of the outer container 100 by means of welding so as to form a first welding line 12, and an empennage 110 for welding is left at the bottom of the outer container 100. In the embodiment, the sealing fin 300 is preferably fixed on the inner wall of the outer container 100 by means of laser welding which can be easily achieved, the inner wall of the outer container and the sealing fin are clung together and then directly welded by means of laser welding without aligning the edge of the sealing fin and the bottom edge of the outer container. Laser welding is only one selection to fix the sealing fin and the outer container, any other means that can seal and fix the sealing fin and the outer container can be used in the embodiment.

More specifically, a folding edge 310 is provided along the edge of the sealing fin 300, which is formed by bending towards downward the edge of the sealing fin as illustrated in FIGS. 2 and 3, the folding edge 310 is attached to and welded to the inner wall of the outer container 100 by laser welding, such that the sealing fin is fixed on the inner wall of the outer container. Thus the thickness and height of the folding edge can be adjusted as requested, and the welding part can be securely sealed. However, the embodiment is also workable without the folding edge.

It is needed to burnish, polish the welding position of the first welding line after the welding between the folding edge of the sealing fin and the outer container is finished, in order to make the welding position smooth, flat.

As illustrated in FIGS. 2 and 3, the vacuum jug 10 further includes an outer bottom cap 400, which is welded seamlessly on the empennage 110 by means of argon arc welding through which a second welding line 13 is formed.

More particularly, in the embodiment, the sealing fin 300 is fixed on the inner wall of the outer container 100 by means of laser welding, while an empennage 110 for welding is left at the bottom of the outer container 100, and the outer bottom cap 400 is welded through argon arc welding to the empennage at the bottom of the outer container 100, thereby two welding lines are formed since the welding positions are different in the two welding steps, and thus no fine leak will occur at the welding positions, the seal effect between the sealing fin 300 and the outer container 100 of the vacuum jug 10 can be ensured and the heat preservation effect is achieved.

In addition, the outer bottom cap 400 and the empennage 110 of the outer container 100 are welded and fixed by means of argon arc welding, it is needed to align the edge of the outer bottom cap 400 and the bottom edge of the outer container 100 during the welding procedure so as to achieve welding, that is, it is necessary to align the edge of the outer bottom edge 400 and that of the empennage 110 during the welding procedure such that no interlayer nor seam occurs between the outer bottom cap 400 and the outer container 100, thus the outer bottom cap 400 and the outer container 100 form into a whole with close connection and strong fixation. With the perfect effect of the respective sealing connection between the outer container of the vacuum container and the sealing fin and the outer bottom cap, the vacuum container is easy to wash, manufacture, use and carry, and is able to prevent the liquid from penetrating into the inside of the vacuum container in accordance with the embodiment.

It is necessary to burnish, polish the welding position of the second welding line 13 after the welding between the outer bottom cap 400 and the empennage 110 is finished, in order to make the welding part smooth, flat.

The sealing fin 300 and the outer bottom cap 400 are made of materials such as stainless steel which has strong intensity, long lifetime and does not rust. However, the sealing fin and the outer bottom cap can also be made of any other metal materials but not limited to stainless steel.

Figure 4:
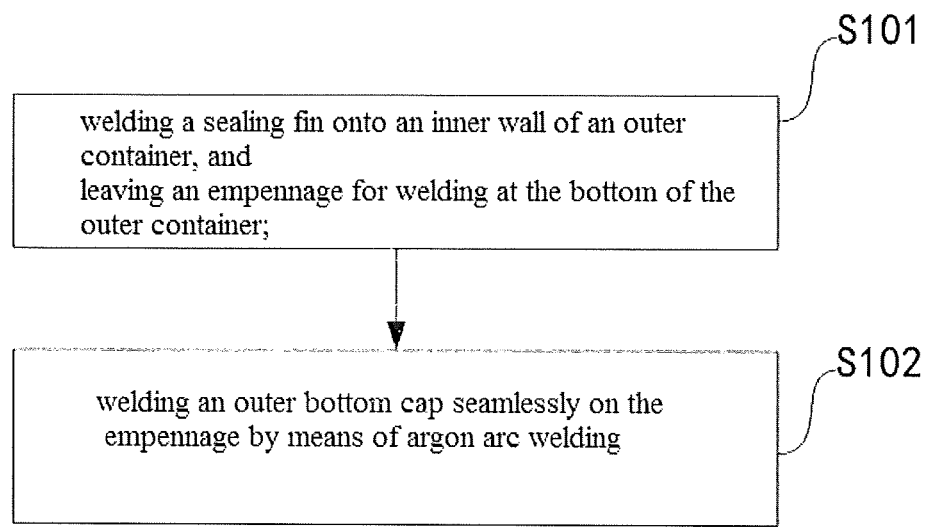
FIG. 4 is a flow chart illustrating the processing method of the vacuum container according to another embodiment of the present invention.

FIG. 4 is a schematic flow chart illustrating part of the procedure for processing a vacuum container in accordance with another embodiment of the present invention. The embodiment discloses a processing method for a vacuum container and also takes a vacuum jug as an example. A vacuum jug 10 of the above-mentioned embodiment can be produced through the processing method of a vacuum jug of the present embodiment, with reference to FIGS. 2 and 3.

Wherein, the processing method includes a step of welding a sealing fin and a step of welding an outer bottom cap;

As illustrated in FIG. 4, the step of welding a sealing fin (S101) comprising: welding the sealing fin on the inner wall of the outer container, and leaving an empennage for welding at the bottom of the outer container;

The step of welding an outer bottom cap (S102) comprising: welding the outer bottom cap seamlessly on the empennage by means of argon arc welding.

More particularly, in the present embodiment, the sealing fin 300 is fixed on the inner wall of the outer container 100 in a welding way, and an empennage 110 for welding is left at the bottom of the outer container 100, and the outer bottom cap 400 is welded through argon arc welding to the empennage at the bottom of the outer container 100, thereby two welding lines are formed since the welding positions are different in the two welding steps, and thus no fine leak will occur at the welding positions, the seal effect between the sealing fin 300 and the outer container 100 of the vacuum jug 10 can be ensured and the heat preservation effect is achieved.

In addition, the outer bottom cap 400 and the empennage 110 of the outer container 100 are welded and fixed by means of argon arc welding, it is needed to align the edge of the outer bottom cap 400 and the bottom edge of the outer container 100 during the welding procedure so as to achieve welding, that is, it is necessary to align the edge of the outer bottom edge 400 and that of the empennage 110 during the welding procedure such that no interlayer nor seam occurs between the outer bottom cap 400 and the outer container 100, thus the outer bottom cap 400 and the outer container 100 form into a whole with close connection and strong fixation. With the perfect effect of the respective sealing connection between the outer container of the vacuum container and the sealing fin and the outer bottom cap, the vacuum container is easy to wash, manufacture, use and carry, and is able to prevent the liquid from penetrating into the inside of the vacuum container in accordance with the embodiment.

More particularly, the specific procedure of processing method for a vacuum jug including First, preparing an outer container 100 and an inner container 200 which locates in the inside of the outer container 100 and is used to fill with liquid; wherein the outer wall of the inner container 200 is separated from the inner wall of the outer container 100, the top of the inner container 200 is hermetically connected with that of the outer container 100, the opening 11 of the vacuum jug where the outer container 100 and the inner container 200 are hermetically connected is formed at the top of the vacuum jug 10. However, it is possible for the embodiment to install two or more inner containers which are separated respectively and sealed with each other inside one outer container.

Then, in step of S101 as illustrated in FIG. 4, fixing the sealing fin 300 onto the inner wall of the outer container 100; wherein the sealing fin 300 and the outer container 100 form into a whole such that sealing between the inner container 200 and the outer container 100 is achieved and the heat preservation effect is realized. More specifically, the sealing fin 300 is fixed on the inner wall of the outer container 100 by means of welding so as to form a first welding line 12, and an empennage 110 for welding is left at the bottom of the outer container 100. In the embodiment, the sealing fin 300 is preferably fixed on the inner wall of the outer container 100 by means of laser welding which can be easily achieved, the inner wall of the outer container and the sealing fin are clung together and then directly welded by means of laser welding without aligning the edge of the sealing fin and the bottom edge of the outer container. Laser welding is only one selection to fix the sealing fin and the outer container, any other means that can seal and fix the sealing fin and the outer container can be used in the embodiment.

More specifically, a folding edge 310 is provided along the edge of the sealing fin 300, which is formed by bending towards downward the edge of the sealing fin as illustrated in FIGS. 2 and 3, the folding edge 310 is attached to and welded with the inner wall of the outer container 100 by laser welding, such that the sealing fin is fixed on the inner wall of the outer container. Thus the thickness and height of the folding edge can be adjusted as requested, and the welding part can be securely sealed. However, the embodiment is also workable without the folding edge.

In the embodiment of the present invention, the sealing fin is fixed on the inner wall of the outer container by means of laser welding, a laser beam with high-energy in laser welding is used as heat source, it has the features of high effectiveness, high precision welding and perfect seal effect when welding the folding edge and the inner wall of the outer container. A laser beam is used as heat source when welding the folding edge and the inner wall of the outer container by means of laser welding, the folding edge and the surface of the outer container are heated by heat conduction that is radiation of the laser, the heat diffuses from the surface of the outer container and the folding edge to the inside respectively through further conduction, the folding edge and the outer container can be melted through control of the width, energy, peak power, repetition frequency of the laser pulse to form specific molten bath, so that the folding edge and the inner wall of the outer container are integrated together and achieve fixed connection and sealing effect.

Air is pumped out from the space between the inner container and the outer container while the sealing fin is being welded onto the inner wall of the outer container to form a vacuum space between the inner and outer container. A vacuum pump can be used to remove the air in the embodiment.

Burnishing, polishing the welding position of the first welding line 12 after welding the sealing fin to the inner wall of the outer container, that is, after welding the folding edge and the outer container, such that the welding part is smooth, flat. However, it is feasible without burnishing or polishing.

Then, in the step of S102 as illustrated in FIG. 4, welding the outer bottom cap 400 on the empennage 110 by means of argon arc welding to form the second welding line 13.

More particularly, the outer bottom cap 400 is welded through argon arc welding to the empennage at the bottom of the outer container 100, thereby two welding lines are formed since the welding positions are different in the two welding steps, and thus no fine leak will occur at the welding positions, the seal effect between the sealing fin 300 and the outer container 100 of the vacuum jug 10 can be ensured and the heat preservation effect is achieved.

In addition, the outer bottom cap 400 and the empennage 110 of the outer container 100 are welded and fixed by means of argon arc welding, it is needed to align the edge of the outer bottom cap 400 and the bottom edge of the outer container 100 during the welding procedure so as to achieve welding, that is, it is necessary to align the edge of the outer bottom edge 400 and that of the empennage 110 during the welding procedure such that no interlayer nor seam occurs between the outer bottom cap 400 and the outer container 100, thus the outer bottom cap 400 and the outer container 100 form into a whole with close connection and strong fixation. With the perfect effect of the respective sealing connection between the outer container of the vacuum container and the sealing fin and the outer bottom cap, the vacuum container is easy to wash, manufacture, use and carry, and is able to prevent the liquid from penetrating into the inside of the vacuum container in accordance with the embodiment.

While welding is performed by means of argon arc welding in accordance with the embodiment of the present invention, argon is provided to the surrounding of the arc welding as protective gas to separate air from the welding area in order to prevent oxidation in the welding area. Argon arc welding uses argon to protect the outer bottom cap and the empennage of the invention based on the common theory of electric-arc welding, the outer bottom cap and the empennage are melted together by high current, and achieve the metallurgical combination, and the object of seamless welding is realized. Since argon is continually provided during the high temperature molten welding, the outer bottom cap and the empennage do not have contact with the oxygen in the air, thereby preventing the oxidation of the outer bottom cap and the empennage. There are some advantages such as high current density, concentrated heat, high deposition rate, fast welding speed, and the welding is finished with good quality, high efficiency, smoothness, is efficient, and it is unlikely to occur situations such as overlap, incomplete penetration, or dent.

A vacuum treatment may be performed for the space formed among the sealing fin, the empennage of the outer container and the outer bottom cap to create a vacuum environment while the outer bottom cap is being welded to the empennage at the bottom of the outer container, so as to further improve the heat preservation effect. In the embodiment, a vacuum pump can be used to remove the air.

In the embodiment, the air may not be pumped out from the space among the sealing fin, the empennage and the outer bottom cap, in this way, the vacuum container manufactured in accordance with the present invention may has the same heat preservation effect with the existing thermos jug. It is preferred that the air among the sealing fin, the inner container and the outer container is pumped out to form vacuum space firstly, and then the air of the space formed by the sealing fin, the empennage and the outer bottom cap is removed to form vacuum space, in order to further enhance the heat preservation effect, thus the vacuum jug manufactured as such method has much better heat preservation effect than that of existing vacuum jug.

Finally, it is needed to burnish, polish the welding position of the second welding line 13 after the welding between the outer bottom cap 400 and the empennage 110 is finished, in order to make the welding part smooth, flat. The detailed procedures are described but not limited to the above description, and they can be achieved through other manners.

In the embodiment, the sealing fin 300 and the outer bottom cap 400 are made of stainless steel material which has strong intensity, long lifetime and does not rust. However, the sealing fin and the outer bottom cap can be made of any other metal materials but not limited to stainless steel.

In the description of the invention, the description of the terms such "an embodiment", "some embodiments", "exemplary embodiment", "example", "specific example", "some example" means that specific feature, structure, material or characteristic described in accordance with the embodiment or example are included in at least on embodiment or example of the present invention. And the specific feature, structure, material or characteristic described can be combined through a suitable manner in one or more embodiments.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A processing method for a vacuum container, characterized by comprising:

a step of welding a sealing fin, wherein welding a sealing fin onto an inner wall of an outer container, and leaving an empennage for welding at the bottom of the outer container;

a step of welding an outer bottom cap, wherein welding an outer bottom cap seamlessly on the empennage by means of argon arc welding.

2. The processing method for a vacuum container of claim 1, characterized in that, in the step of welding a sealing fin, welding the sealing fin on the inner wall of the outer container by means of laser welding.

3. The processing method for a vacuum container of claim 1, characterized in that, in the step of welding an outer bottom cap, polishing the welding mark after the outer bottom cap is welded onto the outer container.

4. The processing method for a vacuum container of claim 1, characterized in that, a folding edge is provided by bending the edge of the sealing fin, and welding a sealing fin is to weld the folding edge of the sealing fin onto the inner wall of the outer container.

5. The processing method for a vacuum container of claim 1, characterized in that, in the step of welding an outer bottom cap, aligning the edge of the empennage with the edge of the outer bottom cap before welding the outer bottom cap onto the empennage.

* * * * *